United States Patent
Herden et al.

(10) Patent No.: US 8,972,144 B2
(45) Date of Patent: Mar. 3, 2015

(54) METHOD FOR CONTROLLING AN ANTISLIP-REGULATED FRICTION BRAKE SYSTEM OF A RAIL VEHICLE

(75) Inventors: Marc-Oliver Herden, Munich (DE); Matthaeus Englbrecht, Munich (DE); Andreas Trinkberger, Taufkirchen (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 149 days.

(21) Appl. No.: 13/880,195

(22) PCT Filed: Oct. 17, 2011

(86) PCT No.: PCT/EP2011/068067
§ 371 (c)(1),
(2), (4) Date: May 31, 2013

(87) PCT Pub. No.: WO2012/052381
PCT Pub. Date: Apr. 26, 2012

(65) Prior Publication Data
US 2013/0261924 A1    Oct. 3, 2013

(30) Foreign Application Priority Data

Oct. 22, 2010    (DE) .......................... 10 2010 049 303

(51) Int. Cl.
| | | |
|---|---|---|
| *B60B 39/00* | (2006.01) | |
| *B60T 8/1761* | (2006.01) | |
| *B60T 8/17* | (2006.01) | |
| *B60T 8/32* | (2006.01) | |
| *B60T 13/66* | (2006.01) | |
| *B60T 17/22* | (2006.01) | |

(52) U.S. Cl.
CPC ........... *B60T 8/1761* (2013.01); *B60T 8/17616* (2013.01); *B60T 8/1705* (2013.01); *B60T 8/3235* (2013.01); *B60T 13/665* (2013.01); *B60T 17/228* (2013.01)
USPC .................................. 701/71; 701/70; 701/81

(58) Field of Classification Search
CPC .................................................. B60T 8/17616
USPC .............................................. 701/70, 71, 81
See application file for complete search history.

(56) References Cited

U.S. PATENT DOCUMENTS

| | | | | |
|---|---|---|---|---|
| 4,746,174 | A * | 5/1988 | Buschmann | 303/113.3 |
| 6,828,746 | B2 * | 12/2004 | Kumar | 318/490 |
| 8,457,818 | B2 * | 6/2013 | Itano et al. | 701/20 |
| 2004/0041465 | A1 * | 3/2004 | Mayer et al. | 303/20 |
| 2004/0148085 | A1 * | 7/2004 | Heuer | 701/70 |
| 2007/0124332 | A1 * | 5/2007 | Ballesty et al. | 707/104.1 |
| 2011/0276223 | A1 * | 11/2011 | Gowan et al. | 701/35 |
| 2014/0190512 | A1 * | 7/2014 | Elstorpff | 134/1 |

FOREIGN PATENT DOCUMENTS

| | | |
|---|---|---|
| CN | 1001691 A | 2/1952 |
| CN | 1745001 A | 3/2006 |
| CN | 1822972 A | 8/2006 |
| CN | 1915723 A | 2/2007 |
| CN | 101678848 A | 3/2010 |
| DE | 102008063892 A1 | 7/2010 |
| FR | 1001691 A | 2/1952 |
| GB | 2402983 A | 12/2004 |

OTHER PUBLICATIONS

Chinese Office Action, dated Aug. 14, 2014 for Chinese Patent Application No. 201180050365.X.
Search Report for German Patent Application No. 10 2010 049 303.1; Sep. 1, 2011.
Search Report for International Patent Application No. PCT/EP2011/068067; Jan. 11, 2012.
International Preliminary Report on Patentability and Written Opinion and Written Opinion of the International Searching Authority and English Translation.

* cited by examiner

*Primary Examiner* — Calvin Cheung
(74) *Attorney, Agent, or Firm* — Barnes & Thornburg LLP

(57) ABSTRACT

A method for controlling an antislip-regulated friction brake system of a rail vehicle or rail vehicle train having a number of braked axles which subjects at least two selected axles to a braking pressure exceeding the braking pressure required for braking; measures at least one variable representing the maximum transmittable frictional force in each case between the wheels of the selected axles and the rail; prepares a list associating the selected axles with the respectively transmittable brake friction force; identifies at least one brake-slipping axle from the selected axles in which a brake slip exceeding a predetermined extent occurs; calculates lost braking work; identifies from the list at least one axle in which brake-slipping does not occur or occurs to a permissible extent; and applies the brakes on at least one axle.

7 Claims, No Drawings

METHOD FOR CONTROLLING AN ANTISLIP-REGULATED FRICTION BRAKE SYSTEM OF A RAIL VEHICLE

PRIORITY CLAIM

This patent application is a U.S. National Phase of International Patent Application No. PCT/EP2011/068067, filed 17 Oct. 2011, which claims priority to German Patent Application No. 10 2010 049 303.1, filed 22 Oct. 2010, the disclosures of which are incorporated herein by reference in their entirety.

FIELD

Disclosed embodiments provide a method for controlling an antislip-regulated friction brake system of a rail vehicle or of a rail vehicle train which is composed of a plurality of rail vehicles and which has a number of braked axles and on a friction brake system controlled according to this method.

BACKGROUND

In the case of rail vehicles, the transmission of braking forces and acceleration forces occurs at the wheel/rail contact point. It is here that the transmission takes place by frictional engagement by means of brake frictional forces acting between components which are composed of steel. The frictional conditions of this frictional engagement are dependent, inter alia, on the temperature, the degree of soiling and the speed. In this context it is possible for the braking force to be given a larger setting during braking than the maximum braking frictional force which can be transmitted at the contact point, which causes the wheels of one or more axles to lock. In such cases, the sliding friction which then occurs causes undesired formation of flat points and a reduction in the transmittable braking frictional forces because the coefficient of friction drops starting from a maximum at a very low relative speed as the relative speed between the frictional parties becomes larger. To prevent this, what are referred to as antislip systems or antislip regulation systems are used which, in the case of locking of a brake, reduce the braking force at the axle in question to arrive again approximately in the region of the static friction or the region of an optimum braking slip.

This reduction in the braking force, performed by the antislip regulation, at axles with locking brakes, leads to a situation in which the desired deceleration of the rail vehicle or rail vehicle train is not achieved and the braking distance is lengthened. This is to be avoided.

German Patent Application No. 10 2008 063 892 A1 discloses a method in which fluctuations in the frictional conditions between the wheel or wheel set and rail are compensated starting from a certain limiting value by adapting the braking force and/or the braking torque. In particular if, when there are a plurality of brake actuators, an unpermitted deviation of a variable representing the frictional conditions between the wheel and the rail is detected at one brake actuator, the braking force at the one brake actuator is increased and for the purpose of compensation the braking force which is generated by a further braking actuator, at which a permitted deviation or no deviation of the variable representing the frictional conditions between the wheel and the rail is present, is reduced.

SUMMARY

Disclosed embodiments provide a method and a friction brake system of the type that a relatively high deceleration occurs during a braking process.

DETAILED DESCRIPTION

The method provides the following steps:
a) subjecting at least two selected axles of the number of braked axles during braking to a braking pressure which exceeds a braking pressure corresponding to the braking request for the braking,
b) measuring at least one variable representing the maximum transmittable braking frictional force in each case between the wheels of the selected axles and the rail, such as the wheel rotational speed, wheel circumferential acceleration, braking force, braking torque or braking pressure,
c) preparing a list in which the selected axles are assigned to their respectively transmittable braking frictional force,
d) identifying at least one axle with brake slip from the selected axles, at which axle, during braking, a brake slip which exceeds a predefined extent occurs and therefore the antislip regulation is activated,
e) calculating lost braking work at the at least one axle with brake slip from the difference between the braking work which would have been carried out without activation of the antislip regulation at this at least one axle with brake slip and the braking work which is actually performed at this at least one axle with brake slip,
f) identifying from the list at least one axle without brake slip or with a permissible degree of brake slip and by means of which a greater frictional force can be transmitted than by the axle with brake slip,
g) applying the brakes at the at least one axle without brake slip or with a permissible degree of brake slip, in such a way that the braking work which is lost at the at least one axle with brake slip is at least partially compensated.

Disclosed embodiments also relate to a device for carrying out the method wherein, for this purpose, already existing hardware may be used, such as, for example, the brake control unit and wheel rotational speed sensors.

In other words, the basic idea is that the braking energy lost at axles with excessive brake slip is compensated by an increase in pressure at axles without brake slip or with a permitted degree of brake slip.

Firstly, the current frictional conditions between at least one group of braked axles (here selected axles) and the rail are determined. For this purpose during braking the selected axles are additionally subjected to braking pressure which goes beyond the braking request, optionally to acquire information about the frictional conditions on the basis of the wheel rotational speed signals of the respective axles and therefore information about the respectively transmittable braking frictional force between the wheels of the selected axles in question and the rail.

Since most braking operations take place without locking of the brakes and it is therefore difficult to draw conclusions as to which braking frictional forces can be transmitted by the selected axles, it is favorable to brake the selected axles with a measured braking force which is higher than the braking force necessary according to the braking request to bring the axles closer to the braking slip limit and/or to exceed the braking slip limit slightly. Only then can reliable conclusions be drawn about the frictional conditions and/or the transmittable braking frictional forces between the selected axles and the rail because some of these axles have a greater tendency towards locking of the brakes than others owing for example to different local frictional conditions along the rail vehicle or rail vehicle train. The axles which can then transmit relatively high or relatively low braking frictional forces then have to be identified.

This assessment is made by measuring at least one variable representing the maximum transmittable braking frictional force or the frictional conditions between the selected axles and the rail, such as the wheel rotational speed, wheel circumferential acceleration, braking force, braking torque or braking pressure.

As a result, a type of profile of the braking frictional conditions which are present at the selected axles during the braking (carried out with higher braking force than the braking request) is determined and stored or else buffered in a list or in a memory in which the braking frictional conditions occurring in the course of the current braking operation, such as the transmitted braking frictional force, are assigned to each selected axle.

In contrast to the prior art in which antislip regulation is implemented only in each case within the scope of an individual rail vehicle and a relevant exchange of data among individual rail vehicles of a rail vehicle train relates only to the wheel rotational speeds for forming a reference speed, the exchange of data or the data flow is extended within the scope of the disclosed embodiments to the effect that data relating to axles with brake slip owing to unfavorable braking frictional conditions and data relating to axles without brake slip or which are still braked without brake slip and are therefore available for compensation are communicated in a rail vehicle train, i.e. throughout the train.

After this, the braking force distribution among the selected axles is carried out as a function of the previously stored profile of the braking frictional conditions. If the braking force which is actually requested according to a braking force request has to be reduced during the present braking of one or more selected axles owing to an intervention by the antislip regulation, the braking work lost by the reduction in the braking force at the respective axles with brake slip may be calculated, for example, by means of the present braking setpoint, the braking pressure, the axle speed and the delay/time.

This lost braking work is then compensated either immediately or else at a later time, i.e. after expiry of a specific time period, but still during the same braking operation by a corresponding increase in the braking work at other axles without brake slip or with brake slip to a permitted degree according to the stored list or the stored profile.

Since the total available braking forces are consequently apportioned to the axles as a function of the brake frictional conditions present at the axles in question, greater deceleration of the rail vehicle or of the rail vehicle train can be achieved on this basis.

According to at least one disclosed embodiment, the compensation of the braking work which is lost at the at least one axle with brake slip takes place during the braking immediately after the step f) in claim 1 or even during the braking, but a predetermined time period after step f).

More precise details can be found in the following description of a disclosed embodiment.

An antislip-regulated brake system of a rail vehicle train which is composed of a plurality of individual rail vehicles has a number of braked and antislip-regulated axles (wheel sets). The brake system can be, for example, a directly acting or an indirectly acting electropneumatic friction brake, wherein the braking pressure acts on brake cylinders which may move brake linings into frictional contact with brake disks which rotate with the axles. The axles are assigned to bogies, optionally two axles per bogie and two bogies per rail vehicle.

The antislip device prevents the locking of the wheel sets during braking, wherein flat points on the wheels can be avoided. The antislip means may be microprocessor-controlled, wherein the rotational speeds of the wheel sets of the individual rail vehicles are detected by wheel rotational speed sensors. The microprocessor calculates actuation of antislip valves on the basis of the rotational speeds in an evaluation logic. By means of the antislip valves, the brake cylinder pressure is reduced, maintained or increased depending on requirements.

The electropneumatic friction brake is controlled by one or more brake control units. Wheel rotational speed sensors signal the wheel rotational speeds of the axles to the brake control unit, into which the evaluation logic of the antislip device may also be integrated.

According to the method disclosed herein, which is carried out in accordance with routines optionally stored in the brake control unit, during braking the brake actuators on at least two selected axles of the rail vehicle train are subjected, by means of actuation by the brake control unit, to a braking pressure which exceeds a braking pressure corresponding to the braking request of the braking operation. More than two axles, in particular all the braked axles, of the rail vehicle train may be selected.

In this context, the wheel rotational speeds which are measured by the wheel rotational speed sensors of the selected axles may make available a variable representing the maximum transmittable frictional force in each case between the wheel sets of the selected axles and the rail. Alternatively, each variable which represents the maximum transmittable braking frictional force in each case between the wheels of the selected axles and the rail, such as for example the wheel circumferential acceleration, the braking force, the braking torque or the braking pressure, can be used.

For example, an average wheel rotational speed is formed from the wheel rotational speeds of the selected axles, and the individual wheel rotational speeds are compared with this average wheel rotational speed, wherein a significantly smaller individual wheel rotational speed indicates a high braking slip of the respective wheel set and therefore frictional engagement in the region of the sliding friction and a somewhat higher wheel rotational speed or an individual wheel rotational speed corresponding to the average wheel rotational speed indicates a low brake slip and therefore frictional engagement in the region of the static friction. Frictional engagement in the region of the sliding friction indicates a relatively low transmittable frictional force, and frictional engagement in the region of the static friction indicates a relatively high frictional force of the axle in question. In this case, the wheel rotational speeds of the selected axles are transferred to the electronic brake control unit for evaluation.

Within the brake control unit there is a memory for storing a list in which the selected axles are then assigned to their respectively transmittable frictional force (high or low).

The evaluation logic within the brake control unit is designed to identify the list of the axles with brake slip at which, while braking is taking place, brake slip which exceeds a predefined degree occurs and therefore the antislip regulation has to be activated.

Furthermore, calculation routines are integrated into the brake control unit to calculate lost braking work at the axles with a high degree of brake slip. The braking work $W_b$ is the work which has to be applied during the braking process:

$$W_b = F_b \cdot s_b$$

where:
$W_b$=braking work in Nm,
$F_b$=braking force in N,
$s_b$=braking distance in m.

Braking work means negative acceleration work and a reduction in kinetic energy.

The lost braking work is calculated as a difference between the braking work which would have been performed without activation of the antislip regulation at the axles with brake slip and the (smaller) braking work which is actually performed at these axles.

At the same time, the brake control unit identifies from the list at least one axle without brake slip or with brake slip to a permitted or small degree and by means of which larger braking frictional forces can be transmitted than by the axles with brake slip.

The braking actuators are then applied, while braking is taking place, at the at least one axle without brake slip or with brake slip to a permitted or small degree by means of the brake control unit in such a way that the braking work which is lost at the axles with brake slip is at least partially and optionally completely compensated.

This lost braking work may be compensated immediately or else at a later time, i.e. after expiry of a specific time period, but still during the same braking operation by a corresponding increase in the braking work at the other axles without brake slip or with brake slip to a permitted or small degree according to the stored list or the stored profile.

Since the total available braking forces are consequently apportioned to the axles as a function of the frictional conditions present at the respective axles, a greater deceleration of the rail vehicle or of the rail vehicle train can be achieved on this basis.

Instead of the braking work as a measure of the relatively low or relatively high braking effect at the selected axles, it is possible to use any variable representing the braking work. Furthermore, the method can also be carried out on merely a single rail vehicle with a plurality of axles in the way described above, in which case, due to the brake slip, lower braking frictional forces can then be compensated on the axles of a bogie by, for example, increasing the braking forces on the axles of the further bogie.

The invention claimed is:

1. A method for controlling an antislip-regulated friction brake system of a rail vehicle or of a rail vehicle train which is composed of a plurality of rail vehicles and which has a number of braked axles, the method comprising:
   subjecting at least two selected axles of the number of braked axles during braking to a braking pressure which exceeds a braking pressure corresponding to a braking request for the braking;
   measuring at least one variable representing a maximum transmittable frictional force in each case between wheels of the selected axles and a rail;
   preparing a list of the selected axles assigned to respectively transmittable frictional force;
   identifying at least one axle with brake slip from the list of selected axles, at which axle, during braking, a brake slip which exceeds a predefined extent occurs and, therefore, antislip regulation is activated;
   calculating lost braking work at the identified at least one axle from the difference between a braking work which would have been carried out without activation of the antislip regulation and a braking work which is actually performed at this the identified at least one axle;
   identifying from the list of selected axles at least one axle without brake slip or with a permissible degree of brake slip for transmitting a greater frictional force than can be transmitted by the axle with brake slip; and
   applying the brakes at the at least one axle without brake slip or with a permissible degree of brake slip, in such a way that the braking work which is lost at the at least one axle with brake slip is at least partially compensated.

2. The method of claim 1, wherein the compensation of the braking work which is lost at the at least one axle with brake slip takes place during the braking immediately after the identification of the at least one axle without brake slip or with a permissible degree of brake slip or during the braking, but a predetermined time period after the identification of the at least one axle without brake slip or with a permissible degree of brake slip.

3. The method of claim 1, wherein a variable representing the braking work is used for the calculation.

4. The method of claim 1, wherein the at least one variable is selected from the group consisting of wheel rotational speed, wheel circumferential acceleration, braking force, braking torque or braking pressure.

5. A friction brake system of a railway vehicle or of a rail vehicle train which is composed of a plurality of rail vehicles and which has a number of braked axles, the friction brake system comprising:
   an electronic control unit;
   brake actuators on at least two selected axles of the number of braked axles which are subjected during braking, under control of the electronic control unit to a braking pressure which exceeds a braking pressure corresponding to the braking requirement for the braking; and
   sensors for measuring at least one variable representing the maximum transmittable frictional force in each case between the wheels of the selected axles and the rail, the at least one variable being selected from the group consisting of: wheel rotational speed, wheel circumferential acceleration, braking force, braking torque and braking pressure, wherein the sensors transfer the measured variable to the electronic control unit,
   wherein the electronic control unit
      identifies at least one axle with brake slip from a list in which the selected axles are assigned to their respectively transmittable frictional force, wherein the identified at least one axle with brake slip has a brake slip which exceeds a predefined degree and activates antislip regulation,
      calculates lost braking work at the at least one axle with brake slip from the difference between the braking work which would have been carried out without activation of the antislip regulation at this at least one axle with brake slip and the actual braking work performed at this at least one axle with brake slip,
      identifies, from the list, at least one axle without brake slip or with a permissible degree of brake slip for transmitting a greater frictional force than can be transmitted by the axle with brake slip,
   wherein the brake actuators at the at least one axle without brake slip or with a permissible degree of brake slip are applied under the control of the electronic control unit during the braking, in such a way that the braking work which is lost at the at least one axle with brake slip is at least partially compensated.

6. The friction brake system of claim 5, wherein the electronic control unit performs the calculation using a variable representing the braking work.

7. The friction break system of claim 4, wherein the at least one variable is selected from the group consisting of wheel rotational speed, wheel circumferential acceleration, braking force, braking torque or braking pressure.

* * * * *